April 7, 1936.    I. G. SHARPE    2,036,779
CABBAGE CORING DEVICE
Filed Dec. 10, 1934
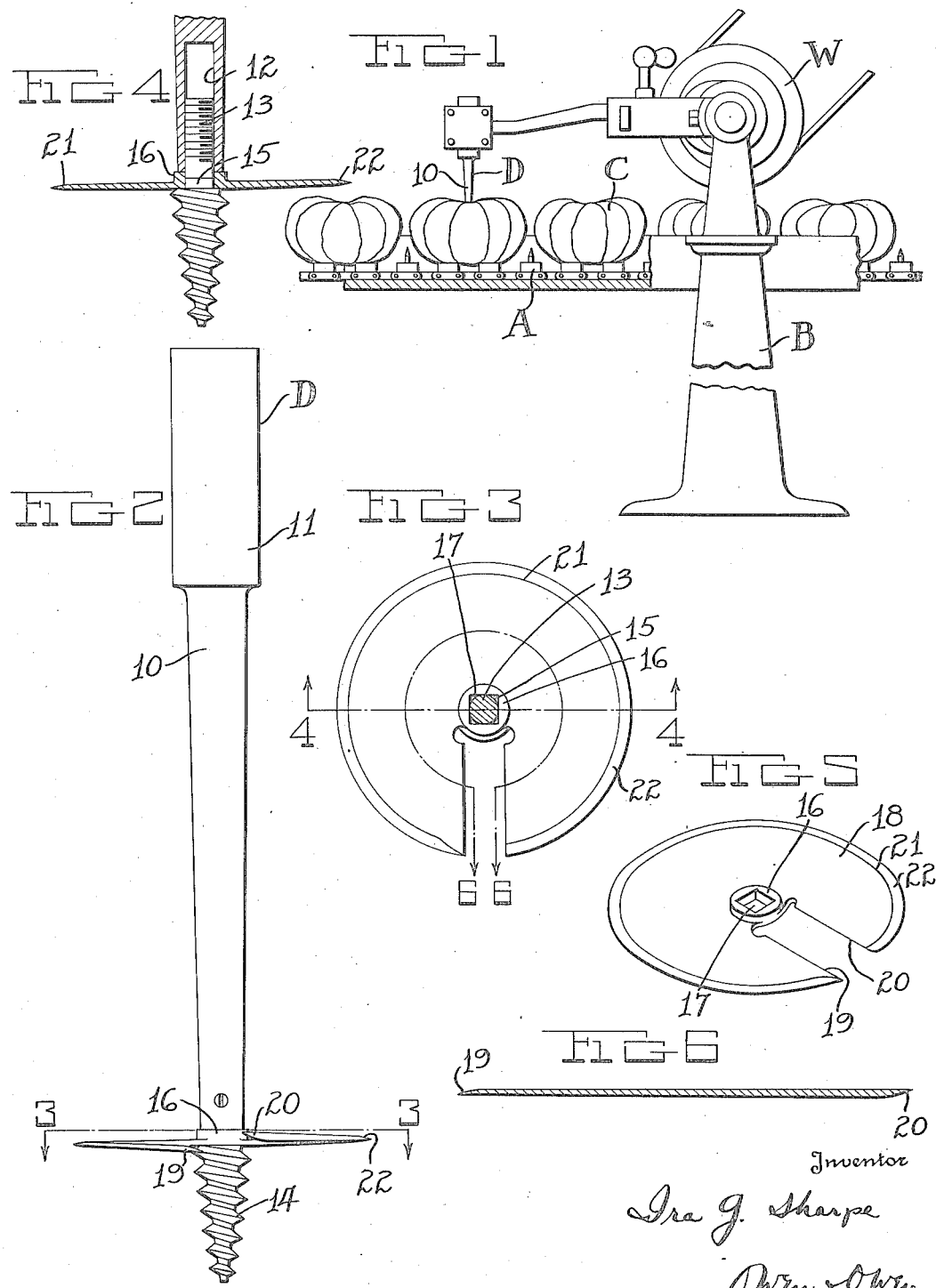
Inventor
Ira G. Sharpe
By Owen & Owen
Attorneys Patented Apr. 7, 1936

2,036,779

UNITED STATES PATENT OFFICE 2,036,779

CABBAGE CORING DEVICE

Ira G. Sharpe, Liberty Center, Ohio, assignor to The Kraut Machinery Corporation, Pittsburgh, Pa., a corporation of Pennsylvania Application December 10, 1934, Serial No. 756,738

8 Claims. (Cl. 146—52)

This invention relates to cabbage coring devices of the type which are adapted to enter the core of the cabbage, cut it, and then retract without removing the core, and an object is to produce a new and improved cabbage corer which cuts the core satisfactorily, but does not remove it and does not cause any waste or loss, and which is steady and reliable and is much safer from the standpoint of the operator than similar devices now in use.

The invention is shown by way of illustration in the accompanying drawing, in which:

Figure 1 is a side elevation of a portion of a cabbage coring machine showing the manner in which the cabbages are conveyed and the mounting for the cabbage corer;

Figure 2 is a side elevation of the cabbage coring device;

Figure 3 is a transverse sectional view on the line 3—3 of Figure 2;

Figure 4 is a sectional view on the line 4—4 of Figure 3;

Figure 5 is a perspective view of the knife blade; and

Figure 6 is a developed edge view of the knife blade.

The illustrated embodiment of the invention comprises a cabbage coring device which in Figure 1 is shown in position of use. The cabbages C are advanced in a row on a chain conveyor A beneath a cabbage coring device D, which is suitably connected to be driven from a driven wheel W mounted on a standard or bracket B. When a cabbage is advanced to a point directly beneath the rotating coring device D, the latter moves downwardly into the core of the cabbage until it reaches the lower end thereof, and then reverses its direction of rotation and moves upwardly out of engagement with the cabbage. This operation and the mechanism for actuating the coring device are well known in the art, and detailed description thereof is not considered necessary for an understanding of this invention.

The coring device D comprises an elongate spindle 10, the upper end 11 of which is enlarged, and is secured in any suitable manner to the driving mechanism, and the lower end of which is tapered and is provided with a screw threaded socket 12 to receive a screw threaded upper end 13 of a tapered helical screw 14. Intermediate the end portion 13 and the helical screw 14 is a squared shoulder portion 15 over which fits a boss 16 having a square hole 17. Integral with the boss 16 is a knife blade 18. It will be apparent that the helical screw 14 holds the boss 16 snugly against the lower end of the spindle 10, the screw threads on the end portion 13 being arranged oppositely to the convolutions of the helical screw 14.

In accordance with this invention the knife blade 18 consists of a relatively thin plate having a circular periphery which is provided with a pair of radial juxtaposed cutting edges 19 and 20, which are spaced longitudinally of the spindle and laterally of each other, and extend approximately from the axis of the plate in the region of the boss 16 to the periphery thereof. As best shown in Figure 2, the plate extends from the cutting edge 19 in a very gradual helix to the cutting edge 20 on both sides of the plate, the undersurface extending in a helical fashion the same as the upper surface. It will also be noted in Figure 2 that the blade 19 merges with the upper helical convolution of the tapered screw 14 so that in effect the helix of the knife blade merges with or provides an extension of the helical screw 14. By providing the opposed sides of the knife blade with helical surfaces, as above explained, it will be apparent that the action of the coring device into and out of the cabbage core is rendered more efficient since this form provides for the desired clearance between the cut portions of the cabbage and the knife blade. It will further be noted that the sharpened edge 19 is beveled or tapered on its upper side, whereas the sharpened edge 20 is tapered on its underside.

The portion of the knife blade adjacent the boss 16 is of greater thickness than the edge portion, and from the central portion of the blade the metal gradually tapers toward the edge portion to substantially the line 21 (Figure 5), and the extreme edge portion 22 tapers on opposite sides to a relatively sharp edge. It will be understood that the tapering of the metal in this manner occurs on both sides of the knife blade.

As indicated in Figure 6, the knife blade adjacent the cutting edge 19 is relatively thin, but it gradually increases in thickness to the cutting edge 20 so that the thicker portion of the blade is adjacent the cutting edge 20, which is the uppermost cutting edge as viewed with the spindle 10 disposed in vertical position.

The above described knife blade has been found to work out most satisfactory in service. It is not only stronger than similar blades heretofore in use, but is much safer from the operator's standpoint than blades presently in use on cabbage coring machines. It is found that this blade does not cause any waste of the cabbage i. e. it does not actually sever particles of the cabbage core or leaves from the remainder, which is most desirable. The beveled peripheral edge is valuable in that it militates against lifting of the fibres when the shaft 10 is reversed to retract the coring device from the cabbage. By tapering the knife blade from the central portion to the edge portion and from the lower cutting edge 19 to the upper cutting edge 20, satisfactory clearance is afforded during the reversal of the direction of rotation for retraction of the coring device. It is apparent that by arranging the knife blade so that its helix merges or provides an extension of the helical convolutions of the tapered screw 14, a very efficient, satisfactory and smooth running mechanism is provided.

Numerous changes in details of construction, arrangement and operation may be effected without departing from the spirit of the appended claims.

What I claim as new and desire to procure by Letters Patent is:

1. In a cabbage coring device having a reversible spindle connected for longitudinal movement in opposite directions and a helical tapered screw at the outer end of the spindle, a knife blade on said spindle adjacent the inner end of the screw, said knife blade comprising a plate having a circular periphery, a pair of radial juxtaposed cutting edges spaced longitudinally of the spindle and extending approximately from the axis of the plate to the periphery thereof, and a helical surface on each side of the plate extending from one cutting edge to the other and forming substantially a continuation of the helix of said screw.

2. In a cabbage coring device having a reversible spindle connected for longitudinal movement in opposite directions and a helical tapered screw at the outer end of the spindle, a knife blade on said spindle adjacent the inner end of the screw, said knife blade comprising a plate having a circular periphery, a pair of radial juxtaposed cutting edges spaced longitudinally of the spindle and extending approximately from the axis of the plate to the periphery thereof, and a helical surface on each side of the plate extending from one cutting edge to the other and forming substantially a continuation of the helix of said screw, said blade tapering from a relatively thick central portion to a relatively thin peripheral edge.

3. In a cabbage coring device having a reversible spindle connected for longitudinal movement in opposite directions and a helical tapered screw at the outer end of the spindle, a knife blade on said spindle adjacent the inner end of the screw, said knife blade comprising a plate having a circular periphery, a pair of radial juxtaposed cutting edges spaced longitudinally of the spindle and extending approximately from the axis of the plate to the periphery thereof, a helical surface on each side of the plate extending from one cutting edge to the other and forming substantially a continuation of the helix of said screw, and a beveled edge on the periphery of the plate.

4. In a cabbage coring device having a reversible spindle connected for longitudinal movement in opposite direction and a helical tapered screw at the outer end of the spindle, a knife blade on said spindle adjacent the inner end of the screw, said knife blade comprising a plate having a circular periphery, a pair of radial juxtaposed cutting edges spaced longitudinally of the spindle and extending approximately from the axis of the plate to the periphery thereof, a helical surface on each side of the plate extending from one cutting edge to the other and forming substantially a continuation of the helix of said screw, said blade tapering from a relatively thick central portion to a relatively thin peripheral edge, and a beveled edge on the periphery of the plate.

5. In a cabbage coring device having a reversible spindle connected for longitudinal movement in opposite directions and a helical tapered screw at the outer end of the spindle, a knife blade on said spindle adjacent the inner end of the screw, said knife blade comprising a plate having a circular periphery, a pair of radial juxtaposed cutting edges spaced longitudinally of the spindle and extending approximately from the axis of the plate to the periphery thereof, a helical surface on each side of the plate extending from one cutting edge to the other and forming substantially a continuation of the helix of said screw, said blade tapering from a relatively thick central portion to a relatively thin peripheral edge and the metal adjacent the lower cutting edge being relatively thin and gradually increasing in thickness to the upper cutting edge, and a beveled edge on the periphery of the plate.

6. In a cabbage coring device having a reversible spindle connected for longitudinal movement in opposite directions and a helical tapered screw at the outer end of the spindle, a knife blade on said spindle adjacent the inner end of the screw, said knife blade comprising a plate having a circular periphery, a pair of radial juxtaposed cutting edges spaced longitudinally of the spindle and extending approximately from the axis of the plate to the periphery thereof, a helical surface on each side of the plate extending from one cutting edge to the other and forming substantially a continuation of the helix of said screw, the metal adjacent the lower cutting edge being relatively thin and gradually increasing in thickness to the upper cutting edge.

7. A knife blade for a cabbage coring device, said blade comprising a plate having a circular periphery, a pair of radial juxtaposed cutting edges spaced longitudinally of each other and extending approximately from the axis of the plate to the periphery thereof, a beveled edge on the periphery of the plate, and a helical surface on each side of the plate extending from one cutting edge to the other.

8. A knife blade for a cabbage coring device, said blade comprising a plate having a circular periphery, a pair of radial juxtaposed cutting edges spaced longitudinally of each other and extending approximately from the axis of the plate to the periphery thereof, a beveled edge on the periphery of the plate, a helical surface on each side of the plate extending from one cutting edge to the other, said blade tapering from a relatively thick central portion to a relatively thin peripheral edge, and the metal adjacent one cutting edge being relatively thin and gradually increasing in thickness to the other cutting edge.

IRA G. SHARPE.